US012800829B2

(12) United States Patent
Zhang et al.

(10) Patent No.: US 12,800,829 B2
(45) Date of Patent: Nov. 17, 2026

(54) DIVERGENCE OPTIMIZED PHOTONIC INTEGRATED CIRCUITS

(71) Applicants: Chong Zhang, Santa Barbara, CA (US); Minh Tran, Goleta, CA (US); Tin Komljenovic, Goleta, CA (US)

(72) Inventors: Chong Zhang, Santa Barbara, CA (US); Minh Tran, Goleta, CA (US); Tin Komljenovic, Goleta, CA (US)

(73) Assignee: Nexus Photonics, Inc, Goleta, CA (US)

( * ) Notice: Subject to any disclaimer, the term of this patent is extended or adjusted under 35 U.S.C. 154(b) by 316 days.

(21) Appl. No.: 18/617,592

(22) Filed: Mar. 26, 2024

(65) Prior Publication Data

US 2025/0306271 A1 Oct. 2, 2025

(51) Int. Cl.
*G02B 6/122* (2006.01)
*G02B 6/12* (2006.01)

(52) U.S. Cl.
CPC ....... *G02B 6/1223* (2013.01); *G02B 6/12004* (2013.01); *G02B 2006/12061* (2013.01); *G02B 2006/12078* (2013.01); *G02B 2006/1215* (2013.01)

(58) Field of Classification Search
None
See application file for complete search history.

(56) References Cited

U.S. PATENT DOCUMENTS

| | | | | |
|---|---|---|---|---|
| 10,120,211 | B2 * | 11/2018 | Zheng | H04B 10/506 |
| 10,530,126 | B2 * | 1/2020 | Ma | H01S 3/083 |
| 2007/0172185 | A1 * | 7/2007 | Hutchinson | G02F 1/025 385/141 |
| 2016/0336718 | A1 * | 11/2016 | Takabayashi | H01S 5/0078 |
| 2017/0040775 | A1 * | 2/2017 | Takabayashi | H01S 5/50 |
| 2017/0139237 | A1 * | 5/2017 | Luo | H01S 5/50 |
| 2018/0226767 | A1 * | 8/2018 | Takabayashi | G01J 1/4257 |
| 2018/0269659 | A1 * | 9/2018 | Ishii | H01S 5/0206 |
| 2019/0103719 | A1 * | 4/2019 | Kurczveil | H01S 5/005 |
| 2019/0346568 | A1 * | 11/2019 | Feng | G01S 7/4813 |
| 2021/0281048 | A1 * | 9/2021 | Heim | H01S 3/1305 |
| 2023/0359051 | A1 * | 11/2023 | Small | G02B 6/4206 |

* cited by examiner

*Primary Examiner* — Jerry Rahll
(74) *Attorney, Agent, or Firm* — Shalini Venkatesh

(57) ABSTRACT

A device includes first, second and third elements fabricated on a common substrate. The first element includes an optical source, the second element includes at least one optical facet coupled to free space, and the third element includes a waveguide that optically couples the first element to the second element. The optical facet, having a compound III-V semiconductor material as a core and a dielectric material as a cladding, is characterized by a refractive index contrast between the core and the cladding that is greater or equal to 1. An optical beam exiting the facet is characterized by a central beam propagation axis and a FWHM beam divergence greater than 40 degrees referred to at least one axis perpendicular to the central beam propagation axis.

7 Claims, 6 Drawing Sheets

150

| Core (refractive index) | Cladding (refractive index) | Index contrast ($n_{core}$ – $n_{cladding}$) | Minimum wavelength of transparency of the waveguide |
|---|---|---|---|
| Si (n ~ 3.48) | $SiO_2$ (n ~ 1.44) | ~2.04 | 1200 nm |
| SiN (n ~ 2) | $SiO_2$ (n ~ 1.44) | ~0.56 | 400 nm |
| GaAs (n ~ 3.6) | AlGaAs (n ~ 3.4) | ~0.2 | 880 nm |
| GaAs (n ~ 3.6) | SiO2 (n ~ 1.44) | ~2.16 | 880 nm |
| InGaP (n ~ 3.4) | SiO2 (n ~ 1.44) | ~1.96 | 650 nm |

DIVERGENCE OPTIMIZED PHOTONIC INTEGRATED CIRCUITS

FIELD OF THE INVENTION

The present invention relates to photonic integrated circuits. More specifically, certain embodiments of the invention relate to improved performance of photonic integrated circuit based illuminators and related components.

BACKGROUND OF THE INVENTION

Illuminators are often used to improve the perception of a camera system. Various types of illuminators, such as flood illuminators, dot projector illuminators, fringe projectors or others are used in combination with a camera to provide improved performance and 3d perception in wide range of conditions including low-light and bright-light environments. Examples of such systems include those used in popular consumer electronics for tasks like face detection and depth mapping. Historically, illuminators were often realized using individual photonic components such as LEDs, VCSELs or edge-emitting lasers, and they could be combined with external elements such as lenses, diffracting optical elements, filters etc.

In contrast to single photonic components, a photonic integrated circuit (PIC) or integrated optical circuit is a device that integrates multiple photonic functions and as such is analogous to an electronic integrated circuit. The major difference between the two is that a photonic integrated circuit provides functions imposed on optical carrier waves.

Today, PICs are most commonly realized in silicon (Si) photonics or indium phosphide (InP) platforms that are operating at longer wavelengths, usually around 1.3 μm and 1.55 μm for datacom and telecom markets. Illuminators, on the other hand, typically operate at wavelengths between 900 nm and 980 nm (often around 940 nm), with this wavelength range being selected for at least two reasons: the ability to use low-cost CMOS/CCD cameras and the fact that, as our eyes are not responsive to these wavelengths, distraction issues are simplified. The relatively low wavelengths require new PIC platforms to be developed to provide PIC-based illuminators. Historically, the 900 nm to 980 nm wavelength range can be achieved with a GaAs photonic platform, able to provide high-performance lasers, modulators and detectors, but a GaAs platform generally cannot provide the highly divergent illumination needed to provide the wide field of view desired for an illuminator. The reason is that high divergence requires very small optical modes and apertures, which in turn require high index contrast waveguides. Here we define the index contrast as the difference between the refractive indices of waveguide core and cladding ($n_{core}-n_{cladding}$). A typical GaAs platform utilizes GaAs and AlGaAs materials for core and cladding, and their refractive index difference is generally small, less than 0.5 for most Al fractions, resulting in relatively large optical modes and consequently more collimated (i.e. low divergence) beams.

Silicon photonics, in which silicon provides the core and silicon-dioxide ($SiO_2$) provides the cladding, provide a very high index contrast (greater than 2, as $n_{SiO2}$~1.44, and $n_{Si}$~3.48.). This results in relatively small optical modes and apertures, and could be very suitable for divergent beams, but unfortunately silicon is not transparent in the wavelength range of interest (900 nm to 980 nm) so it cannot be used for a waveguide core in this wavelength range, though it can and often does serve as a detector material in this range, for CMOS/CCD cameras.

The ability to make a PIC that supports operation below the silicon bandgap wavelength (and ideally from 900 nm to 980 nm), while also supporting highly divergent beams would enable more advanced illuminators that could leverage additional PIC functionality such as phase control, on-chip power monitoring, switchable or multiple outputs etc., but currently no single platform can meet all the requirements.

Here we describe a heterogeneously integrated illuminator and related components with improved performance, that use dissimilar materials to meet all the performance requirements listed above. The heterogeneously integrated illuminator utilizes die-to-wafer or wafer-to-wafer bonding to enable III-V compound waveguides on an isolator (dielectric), and facets that are fully encapsulated by low-refractive index dielectrics to provide very high confinement and small mode sizes. The current invention supports on-chip source integration using bonding of III-V material suitable to provide optical gain, resulting in a chip-sized fully-integrated highly-divergent output illuminator. Furthermore, by optimizing the shape of the facets and their number, the illuminator can support flood illumination (from a single facet), or provide a variety of patterns, e.g. by using two spaced facets/outputs which form a familiar double-slit fringe pattern. By tuning the optical phase between the two facets (using a phase shifter), the pattern can be further steered in far-field. More advanced patterns using more than two facets can also be designed. Full integration with on-chip sources further enables size, weight and power reduction, as well as cost reduction at scale due to wafer-scale manufacturing and testing.

The present invention is directed towards improving the state of the art of illuminators realized as heterogeneously integrated PICs. In particular, embodiments described below are concerned with the detailed design of PIC architecture, individual components and free-space coupling structures necessary for the creation of high-performance illuminators, able to provide highly divergent illumination for the next generation of sensors in various fields including, but not limited to, augmented reality (AR), virtual Reality (VR), machine vision, general perception systems, light detection and ranging (LIDAR), healthcare and life-sciences.

DETAILED DESCRIPTION

Figure 1:
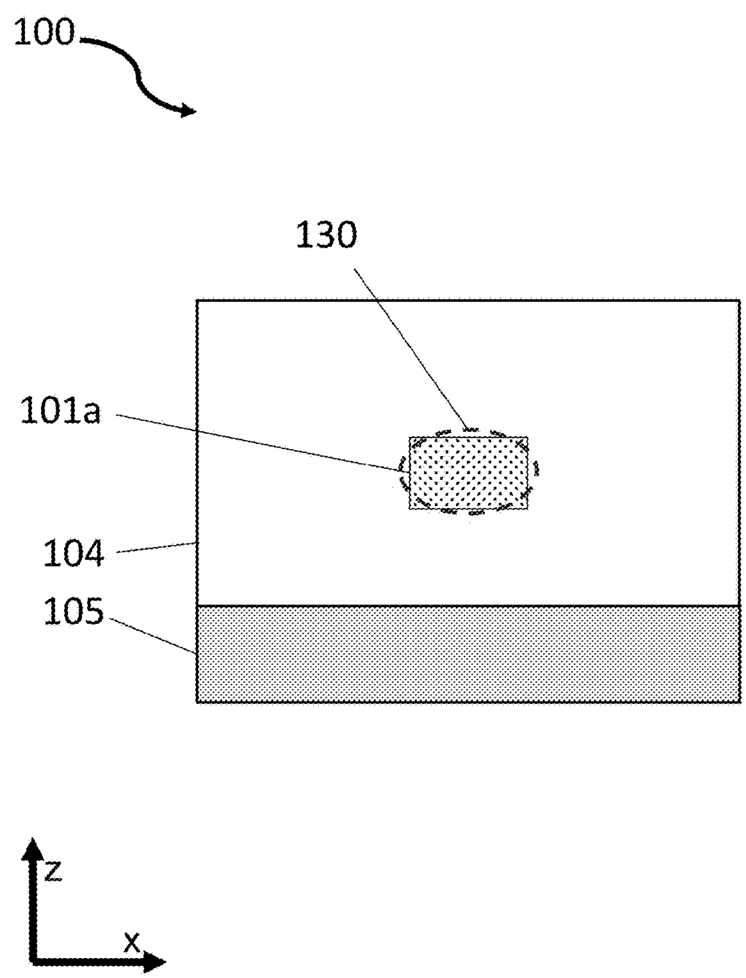
FIG. 1 illustrates a device according to one embodiment of the present invention, shown in cross-section.

Described herein include embodiments of a heterogeneously integrated illuminator and related components with improved performance, leveraging dissimilar materials to improve the functionality, performance and reduce size, weight, and cost.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, such as e.g. thin coating layer typically used to provide high-reflectivity or anti-reflectivity functionality. It should be noted that the axes of two waveguide structures or elements need not be colinear for them to be accurately described as being butt-coupled. In other words, the interface between the elements need not be perpendicular to either axis in all cases. For example, this interface may be angled to control the reflections at the interface. No adiabatic transformation occurs between butt-coupled structures/interfaces.

Term "active device", "active structure" or otherwise "active" element, part, component may be used herein. A device or a part of a device called active is capable of light generation, amplification, modulation and/or detection using electrical contacts. This is in contrast to what we mean by a "passive device" whose principal function is to confine and guide light, and/or provide splitting, combining, filtering and/or other functionalities that are commonly associated with passive devices. Some passive devices can provide functions overlapping with active device functionality, such as e.g. phase tuning implemented using thermal effects or similar that can provide modulation. No absolute distinction should be assumed between "active" and "passive" based purely on material composition or device structure. A silicon device, for example, may be considered active under certain conditions of modulation, or when used for the detection of low wavelength radiation, but passive in most other situations.

FIG. 1 includes a cross-section view of an integrated photonic device 100 showing a highly diverging facet, the term "highly divergent" being defined in terms of a lower limit on the full-width-at-half-maximum (FWHM) angle at which light emerges from that facet into free space. In some embodiments, we define the highly diverging facet as a facet whose output beam in free-space diverges at a FWHM angle greater than 40 degrees with reference to at least one axis perpendicular to the central axis of beam propagation. In some embodiments, the divergence can be larger than 60 degrees, and even approach 90 degrees, for each of two mutually perpendicular axes, each one perpendicular to that central axis. Typically, the relevant axes correspond to x and z directions as shown, along waveguide width and waveguide height. The cross-section shown includes a substrate 105 which can be any type of substrate suitable for semiconductor and dielectric processing, such as Si, InP, GaAs, quartz, sapphire, glass, GaN, silicon-on-insulator and/or other materials known in the art. Material 104 provides optical cladding for material 101*a* (to be described in more detail below). Optical waveguides are commonly realized by placing a higher refractive index core between two lower refractive index layers and patterning to confine the optical wave as desired. In some embodiments, layer 104 can be the same material as substrate 105 itself (e.g. quartz, sapphire, etc.). The most common material to provide the cladding functionality is $SiO_2$ which is characterized by low-optical loss, high bandgap, and low refractive index, all of which are preferred for the highly diverging heterogeneous facet to be discussed below. Other materials, such as SiNOx (silicon-oxynitride), or others, characterized by relatively low refractive index can also be utilized.

Material 101*a* is a compound III-V semiconductor that provides the core functionality for the waveguide and the facet. In some embodiments it comprises at least one of GaAs, AlGaAs, and InGaP. In other embodiments it can comprise also at least one of InP, InGaAsP, AlInGaAs, and InGaAs. Yet other III-V semiconductors (including ternaries and quaternaries) can also be used. Material 101*a* preferably has low optical loss at the wavelength of interest (typically lying between 900 nm and 980 nm, and in some other embodiments typically between 850 nm and 1000 nm) and has high-refractive index to enable high index contrast waveguides (in combination with cladding 104) and small optical mode 130. In some embodiments, the optical mode size (or mode effective area) is smaller than $\lambda^2$, in other embodiments it is smaller than $0.2\times\lambda^2$, where $\lambda$ is the wavelength.

Table 150 summarizes some combinations of material 101*a* (core) and material 104 (cladding) with their refractive indices (note that they vary depending on wavelength and composition for the case of ternaries and quaternaries), (refractive) index contrast and approximate shortest wavelength where they provide optical transparency as needed for waveguides and facets. Silicon photonics (Si and $SiO_2$) provides very high refractive index contrast but is limited to operation above wavelengths of 1200 nm, making it clearly unsuitable for illuminators operating below 1000 nm wavelength. An alternative platform using SiN and $SiO_2$ has the advantage of supporting operation all the way down to 400 nm but provides a refractive index contrast of only ~0.56. Similarly, a native GaAs platform in which AlGaAs provides the cladding, while supporting operation down to ~880 nm wavelengths, provides only ~0.4 refractive index contrast resulting in larger mode sizes. Only the use of compound III-V semiconductors, for the waveguide core, combined with low-refractive index dielectrics (e.g. $SiO_2$) for cladding support operation at short wavelengths while also providing a high refractive index contrast of ~2. For operation between 850 nm and 1000 nm, the waveguide core dimensions can be smaller than 300 nm (in one or both of the width and height) resulting in small optical mode sizes. In some embodiments, width and/or height can be smaller than 200 nm. Such material geometries with high index contrast can be realized using advanced integration such as heterogeneous integration in which III-V materials are bonded on suitable prepared wafers. An illustrative process flow to realize such diverging facet will be described below with the help of FIG. 6.

Figure 2:
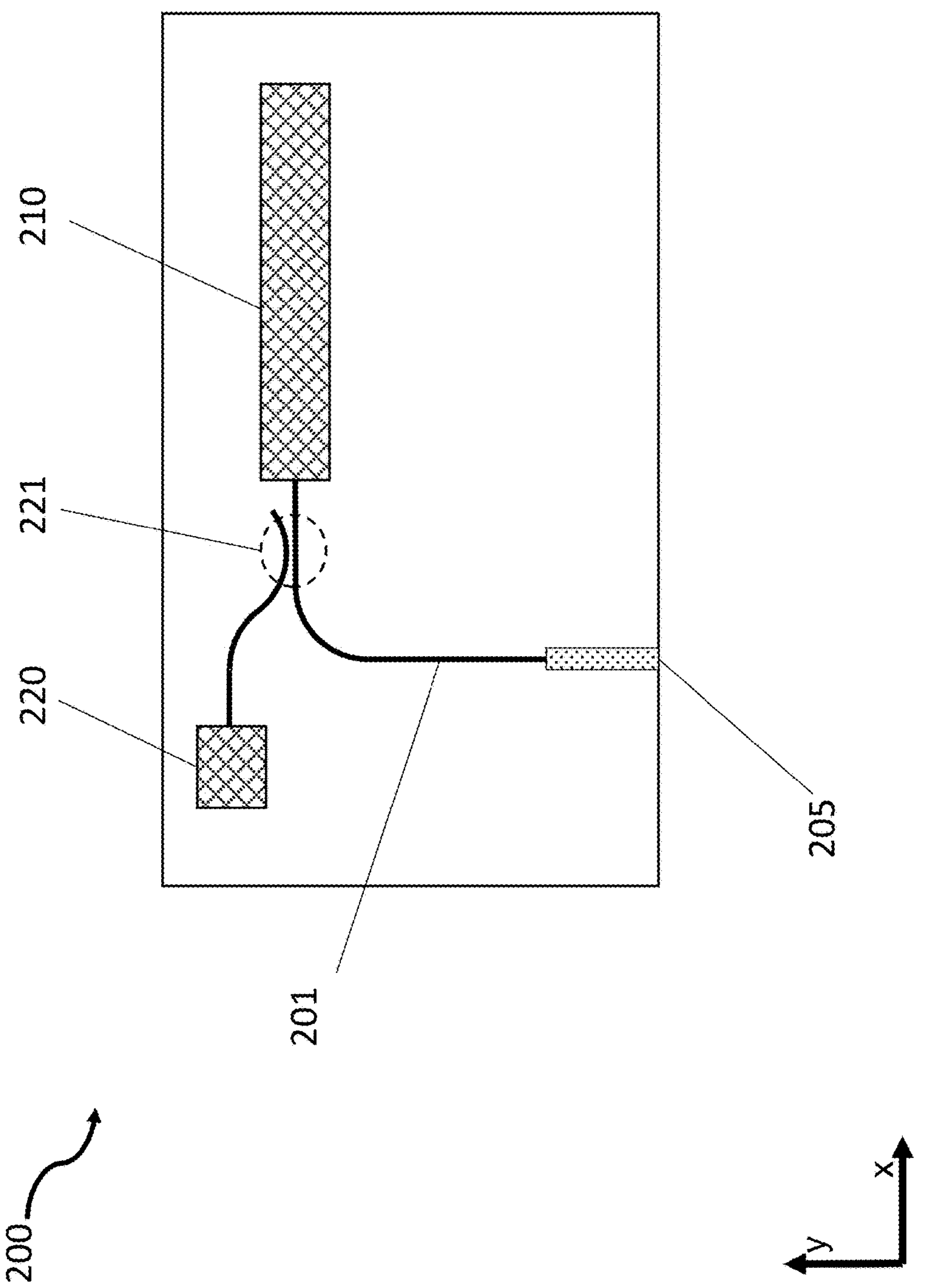
FIG. 2 illustrates a device according to some embodiments of the present invention shown in top-view.

FIG. 2 is a schematic top-view of an integrated photonic device 200 showing one embodiment of an integrated illuminator. In this and some other similar embodiments, the integrated illuminator comprises at least two functional elements 205 and 210 connected by waveguide 201. Element 210 is an optical source providing efficient light generation when injected with current. Optical source 210 can be a Fabry-Perot laser, a single-frequency laser, a wavelength-stabilized laser, a tunable laser, a broadband optical source (such as a super-luminescent diode), or another type of optical source. Common materials used to realize the optical source depend on the desired operation wavelength and can include InP and InP-based ternary and quaternary materials, GaAs and GaAs based ternary and quaternary materials, GaN and GaN based ternary and quaternary materials, GaP, InAs and InSb and their variations and derivatives or any other suitable material for providing optical emission at wavelengths of interest. More details related to the realization of the optical source will be provided with the help of FIGS. 4 and 5.

Optical source 210 is connected to facet 205 via the waveguide 201. Facet 205 has dimensions optimized in both thickness and width to maximize the divergence of an optical beam exiting the facet as an output beam. The exact dimensions depend on the desired wavelength of operation and the refractive index contrast between the core and cladding material achievable with material combinations as discussed above and shown in Table 150 of FIG. 1. Such optimization is straightforward to perform using typical electromagnetic solvers in which the dimensions of the facet are generally chosen such that the optical mode size is minimized at the facet. Waveguide 201, in some embodiments, can have dimensions matching those of the facet 250 and be made from the same materials. In other embodiments, the dimensions of waveguide 201 can be optimized to provide lower propagation loss or some other needed functionality (involving e.g. bend radius optimization, filtering of higher-order modes, polarization control). In yet other embodiments, waveguide 201 can utilize different materials than those at the facet as will be described below, in the description of FIG. 4.

Some embodiments can also comprise a monitor photodetector, like element 220 shown in FIG. 2, that is optically coupled to the optical source 210 via a splitter 221. Splitter 221 taps a small part of the incident signal (typically <10%) from the source, and couples it to the monitor photodetector 220, which can then be used to control the laser operation (e.g. output power). In some embodiments (and also as shown in FIG. 2), the optical source 210 and the facet 205 are physically placed and oriented such that any stray light from the optical source (which predominantly outputs light along the indicated x-axis) has minimal impact on the output from facet 205 (which predominantly outputs along the indicated y-axis). In some embodiments, it may be acceptable for optical source 210 and facet 205 to be oriented along the same axis. In yet other embodiments (not shown) additional structures, such as metallization, vias, opaque epoxy or similar, can be used to further control stray light.

Figure 3:
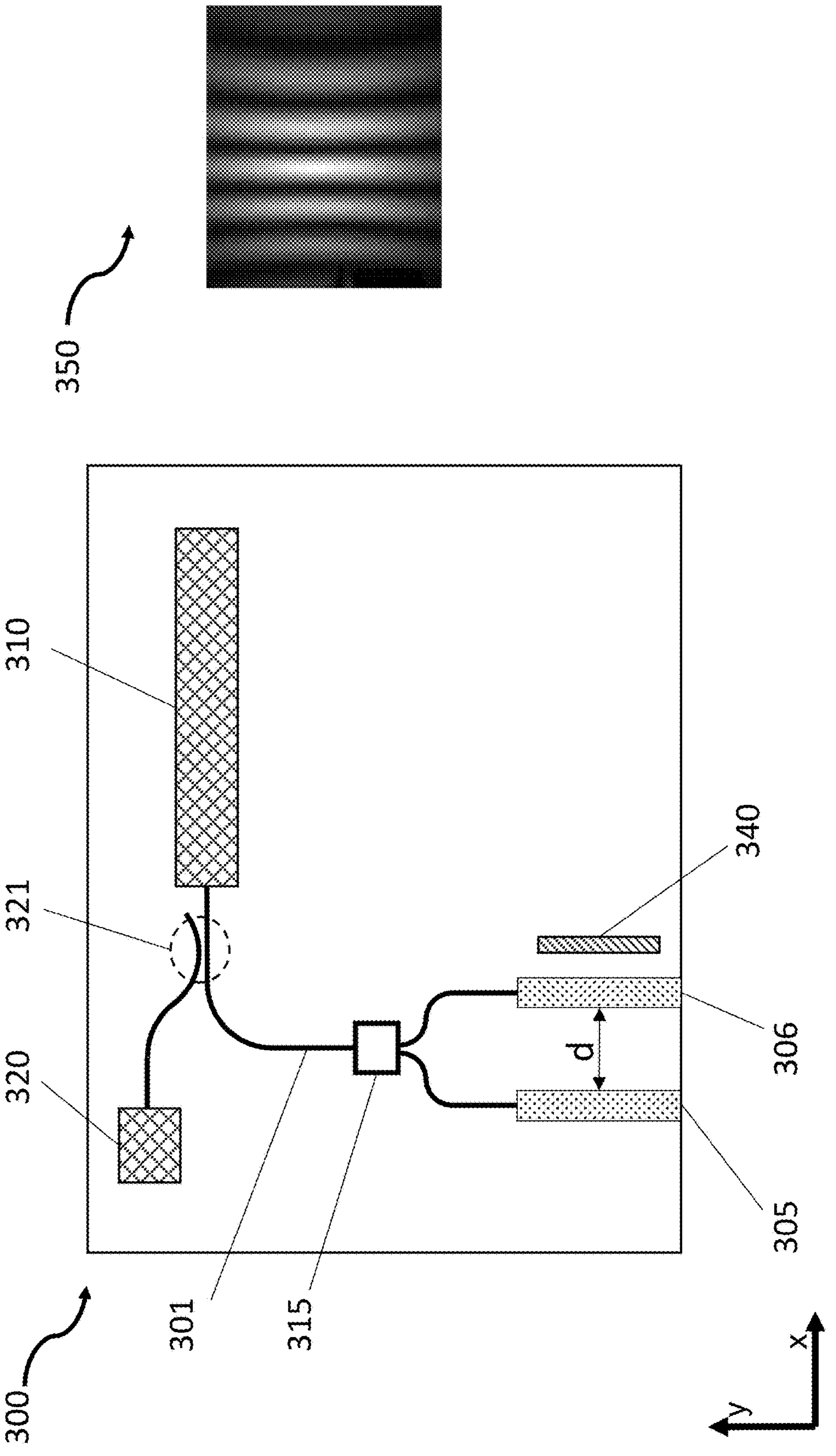
FIG. 3 illustrates a device according to some embodiments of the present invention shown in top-view.

Integrated illuminator 200 can provide controlled flood illumination and replace e.g. LED or VSCEL based illuminators. Advantages include better control of the output mode/divergence, higher output powers, and the ability to use multiple facets that can be used to cover wider angular space. In some embodiments (not shown) multiple facets may each be used to receive portions of the source output light, and then cover a wider angular space with illumination. This could be achieved by angling each facet at a different angle or designing the integrated illuminator 210 such as to output the light at multiple edges. To keep the flood illumination pattern, it is important to design the facets such that their outputs do not overlap in the far-field, as otherwise this will result in fringe patterns as shown in FIG. 3. Another option (not shown) is to have a switch that will route the source output light to only a selected group of facets at the same time (to prevent outputs of some facets overlapping at the same time). Designs with multiple sources or facets can then be turned/pulsed in particular sequences. In cases where optical source 101 is tunable, the wavelength output from the facet or facets can also be controlled.

FIG. 3 is a schematic top-view of an integrated photonic device 300 showing another embodiment of an integrated illuminator. In this and some other similar embodiments, the integrated illuminator comprises at least four functional elements 305, 306, 310, and 315 connected by waveguide 301. Element 310 is an optical source providing efficient light generation when injected with current. Optical source 310 can be any of the types of sources discussed above with respect to optical source 210 in FIG. 2. Common materials used to realize the optical source depend on the desired operation wavelength and can include InP and InP-based ternary and quaternary materials, GaAs and GaAs based ternary and quaternary materials, GaN and GaN based ternary and quaternary materials, GaP, InAs and InSb and their variations and derivatives or any other suitable material for providing optical emission at wavelengths of interest. More details related to the realization of the optical source will be provided with the help of FIGS. 4 and 5. Optical source 310 is connected to at least two facets 305 and 306 via the waveguide 301 and splitter 315. Splitter 315 divides the incoming light from the optical source 310 into at least two parts, each of which is coupled to at least one corresponding facet, in the case shown, to facets 305 and 306 respectively. The splitter is optimized such that powers delivered to each of the facets are as similar as possible, as this improves the fringe pattern contrast (extinction ratio) of the output from the combination of facets. An illustrative fringe pattern in view 350 shows regions of high intensity and regions of low intensity. The fringe pattern contrast (extinction ratio) is defined as the ratio between high and low intensity regions. Splitter 315 is typically realized as an MMI splitter, or Y-junction splitter, but precisely controlled splitting could also be provided by directional couplers, adiabatic couplers, or inverse design elements. Facets 305 and 306 have dimensions optimized in both thickness and width to maximize the divergence of their output beams. The exact dimensions depend on the desired wavelength of operation and the refractive index contrast achievable with material combinations as discussed above and shown in Table 150 of FIG. 1. Such optimization is straightforward to perform using typical electromagnetic solvers in which the dimensions are generally chosen such that the optical mode size is minimized at the facet. The separation between the facets ("d" in FIG. 3) defines the fringe angular spacing. As spacing can be very precisely controlled using lithography, various fringe angular spacings can be realized and optimized depending on the system level requirements.

Waveguide 301, in some embodiments, can have dimensions matching those of facets 305 and 306 and be made from same materials. In other embodiments, the dimensions of waveguide 301 can be optimized to provide lower propagation loss or some other needed functionality (involving e.g. bend radius optimization, filtering of higher-order modes, polarization control). In yet other embodiments, waveguide 301 can utilize different materials than those at the facet as will be described below, in the description of FIG. 4.

Some embodiments can also comprise at least one tuner element, such as element 340 shown in FIG. 3. The function of the tuner element is to change the phase relationship between the light at the facets, and consequently steer the fringe pattern. This can enable more advanced depth perception and tracking functionality compared to what can be achieved with configurations that cannot be steered. Tuner element 340 can be, for example, a thermal tuner or a III-V based phase tuner utilizing electro-optic tuning, as will be described with the help of FIG. 4.

Some embodiments can also comprise a monitor photodetector, like element 320 shown in FIG. 3, that is optically coupled to the optical source 310 via a splitter 321. Splitter 321 taps a small part of the incident signal (typically <10%) from the source, and couples it to the monitor photodetector 320 which can then be used to control the laser operation (e.g. output power). In the shown embodiment (similarly to that shown in FIG. 2), the optical source and the facets are physically placed and oriented such that any stray light from the optical source (in this case source 310 predominantly outputs light along the indicated x-axis) has minimal impact on the output from the facets (in this case, facets 305 and 306 predominantly output light along the indicated y-axis).

In some embodiments, it is acceptable for optical source 310 and facets 305/306 to be oriented along the same axis. In yet other embodiments (not shown) additional structures, such as metallization, vias, opaque epoxy or similar, can be used to further control stray light.

The fringe pattern provided by integrated illuminator 300 can be most conveniently tuned with the use of tuning element 340, but tuning can also be achieved by, for example, having non equal lengths of waveguides after splitter and either heating the whole chip or by tuning the source wavelength, both of which will change the phase relationship between the light at the facet. The tuning, which acts by controllably changing angular spacing of the fringes, can be discrete (e.g. to switch between predetermined fringe patterns) or continuous.

Both types of illuminators (200 and 300) can comprise multiple optical sources and facets. In some embodiments, illuminators can provide both a single-facet flood output and a fringe output, utilizing the ability of PICs to integrate large number of photonic components in single device. Illuminators with various fringe angular spacings (determined by the distance "d" between facets) can also be readily designed and fabricated. In some embodiments, the distance "d" is between 0.5 μm and 1000 μm.

Figure 4:
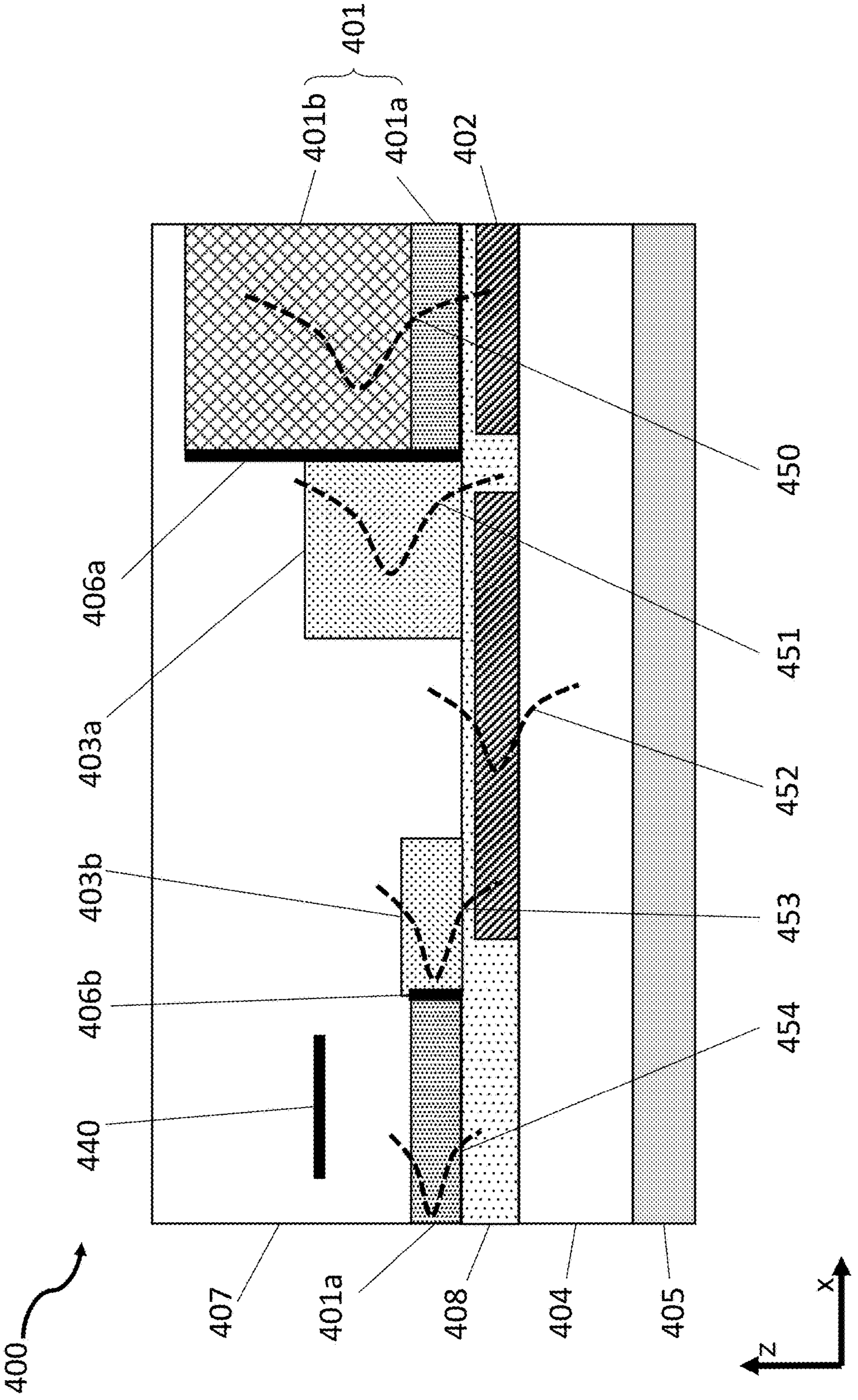
FIG. 4 illustrates a device according to one embodiment of the present invention, shown in cross section.

FIG. 4 is a schematic cross-section view of an embodiment of an integrated photonic device 400, which supports on chip integration of a source 401 (corresponding to 210/310) delivering light into a waveguide 401*a* with a core material very different to that of its cladding (407 above, and 408, 404 and/or 405 below), and able to provide a highly divergent beam at an output facet, such as the facet of layer 401*a* shown at the edge on at the left side of the figure. This particular embodiment integrates other elements and components such as waveguide 402, intermediate waveguides 403*a* and 403*b* butt-coupled to waveguide 401 at the right of the figure and waveguide 401*a* near the left (for efficient coupling without stringent fabrication tolerance requirements as discussed, for example, in U.S. Pat. No. 10,641,959) and tuner 440. In other embodiments, other elements may be fabricated into the PIC to the left of the portion shown in FIG. 4, before the light is recoupled into a final section of waveguide core 401*a* comprising the (unshown) output facet.

The illustrative cross-section includes a substrate 405 that can be any suitable substrate for semiconductor and dielectric processing, such as Si, InP, GaAs, quartz, sapphire, glass, gallium-nitride (GaN), silicon-on-insulator (SOI) or other materials known in the art. In the shown embodiment, a layer of material 404 is deposited, grown, transferred, bonded, or otherwise attached to the top surface of substrate 405 using techniques known in the field. The main purpose of layer 404 is to provide partial optical cladding for material 402 and 401*a* (to be described below), if necessary to form an optical waveguide. We call 404 partial cladding as e.g. layers 407 and 408 can also provide (partial) cladding for the cores of the waveguides made in layers 402 and 401*a*. Optical waveguides are commonly realized by placing a higher refractive index core between two lower refractive index layers serving as cladding to confine the optical wave. In some embodiments, layer 404 is silicon-dioxide ($SiO_2$). In yet other embodiments, layer 404 is omitted and substrate 405 itself serves as a cladding.

Layer 402 is deposited, grown, transferred, bonded, or otherwise attached to the top of layer 404 if present, and/or to the top of substrate 405 if there is no layer 404, using techniques known in the field. The refractive index of layer 402 is higher than the refractive index of layer 404 if present, or, if layer 404 is not present, the refractive index of layer 402 is higher than the refractive index of substrate 405. In one embodiment, the material of layer 402 may include, but is not limited to, one or more of SiN, silicon-oxinitride (SiONx), titanium-dioxide ($TiO_2$), tantalum-pentoxide ($Ta_2O_5$), (doped) $SiO_2$, lithium-niobate ($LiNbO_3$), alumina ($Al_2O_3$) and aluminium-nitride (AlN). Either or both layers 404 and 402 can be patterned, etched, or redeposited to tailor their functionality (define waveguides, splitters, couplers, gratings, and other passive components) as is common in the art.

Layer 408, whose refractive index is lower than the refractive index of layer 402, underlays layers 401 and 403*a*/403*b* (described below). Layer 408 serves to planarize the patterned surface of layer 402. In some embodiments, the planarity of the top surface of layer 408 is provided by chemical mechanical polishing (CMP) or other etching, chemical and/or mechanical polishing methods. In other embodiments, the planarity is provided because of the intrinsic nature of the method by which layer 408 is deposited, for example if the material of layer 408 is a spin-on glass, polymer, photoresist or other suitable material. The planarization may be controlled to leave a layer of desired, typically very low, thickness on top of the layer 402 (as shown in FIG. 4), or to remove all material above the level of the top surface of the layer 402 (not shown). In cases where layer 408 is left on top of layer 402, the target thicknesses are in the range of several nm to several hundreds of nm, with actual thickness, due to planarization process non-uniformities, being between zero and several hundreds of nanometers larger than the target thickness. In some embodiments, spin-on material is used to planarize and is then etched back resulting with improved across wafer uniformity compared to typical CMP processes. In other embodiments, selective slurries are used in CMP process to improve uniformity and stop on particular layer as is known in the art. The top surface of layer 408 is typically characterized with low surface roughness which makes it suitable for bonding. In some cases, roughness is <5 nm RMS, in yet other embodiments it is <1 nm RMS. It is generally known that bonding yield is improved as surface roughness is reduced. Good CMP process can result in surface roughness <0.5 nm RMS. In some embodiments, layer 408 comprises $SiO_2$.

Layer 401 is bonded on top of at least part of the corresponding (408, 402) top surface. The bonding can be direct molecular bonding, or additional materials can be used to facilitate bonding such as e.g. polymer films as is known in the art. The bonding material, if used, has to have reasonably low losses at the wavelength of operation as the optical modes 450, 451, 452, 453 and 454 (described in more detail below) have some overlap with top surfaces of layers (408,402). Layer 401 comprises two distinct sublayers 401*a* and 401*b*. Sublayer 401*a* comprises a compound III-V semiconductor waveguide structure suitable for providing one or more high divergence facets as described above in the discussion of FIGS. 1-3. Sublayer 401*b* makes up what is commonly called an active device, and is made up of materials including, but not limited to InP and InP-based ternary and quaternary materials, GaAs and GaAs based ternary and quaternary materials, GaN and GaN based ternary and quaternary materials, GaP, InAs and InSb and their variations and derivatives or any other suitable material for providing optical emission at wavelengths of interest. Sublayer 401*b* comprises additional sublayers to provide optical gain (by forming, for example, quantum wells, quantum dots or similar structures), and optical and electrical confinement as needed for efficient electrically injected optical sources. Sublayers of layer 401*b* in some embodiments provide vertical confinement (along the z-axis in FIG. 4), while lateral confinement (along an unshown y-axis, normal to the cross-section in FIG. 4) is provided by at least one etch, as is known in the art for active devices. The interface between sublayers 401*a* and 401*b*, in some embodiments, comprises an etch selective structure (not shown) that enables superior control of the sublayer 401*b* removal from the top of sublayer 401*a* over the portion shown on the left side of FIG. 4. In these cases, sublayer 401*a* provides a highly divergent facet at its output end surface, while preserving its own high-quality top surface.

Layers 403*a* and 403*b* are present to facilitate efficient coupling between layers 401 supporting mode 450, layer 402 supporting mode 452 and sublayer 401*a* supporting mode 454, each having a different effective mode index. In some embodiments, layer 403*a* and 403*b* comprise one of SiN, SiNOx, and polymer. Layer 403*a* serves as an intermediate waveguide that accepts the profile (depicted by line 450) of an optical mode supported by the waveguide for which layer 401 provides the core, captures it efficiently as mode profile 451, and gradually transfers it to mode profile 452 for which layer 402 provides the core. Similarly, layer 403*b* serves as an intermediate waveguide that gradually transforms mode 452 to mode 453 that in turn can be efficiently coupled to mode 454 for which sublayer 401*a* provides the core. Neither of the transitions from mode 450 to 451, and 453 to 454 utilizes tapers to adiabatically transfer the modes using e.g. evanescent coupling, but instead utilizes butt-coupling at the interface. The transitions between modes 451, 452 and 453 utilize tapers in at least one of the layers 403*a*, 402 and 403*b*, in one or more unshown planes perpendicular to the x-z plane shown in FIG. 4, to facilitate adiabatic mode transformation.

Each of the layers 406*a* and 406*b* is optional, primarily serving as either an anti-reflective or a highly reflective coating at the interface between the pair of layers 401 and 403*a*, and/or the pair of layers 403*b* and 401*a*. The use of intermediate layers 403*a* and 403*b* significantly improves efficient transfer between high refractive index materials (401*a*/401*b*) and lower refractive index materials (402) without using prohibitively narrow taper tips. The transitions between 402, 403*a* and 403*b*, due to smaller effective index difference, can utilize larger taper dimensions, to facilitate efficient evanescent coupling.

The upper cladding layer 407 can be any suitable material including, but not limited to, a polymer, $SiO_2$, SiNOx, etc. In some embodiments, the same material is used for layer 404 and layer 407. In some embodiments (not shown), layer 407 cladding functionality can be provided with multiple depositions and multiple materials, e.g. to provide both cladding and passivation of the active device.

Optional tuner element 440 (corresponding to element 340 in FIG. 3) can be realized as a resistive element to provide thermal tuning of the phase of the optical mode 454. In other embodiments (not shown), phase tuning can utilize the electro-optic tuning capability of the compound semiconductor material making up sublayer 401*a*. That capability may make use of effects including electro-absorption, the Franz-Keldysh effect, the quantum-confined Stark effect, the Pockels effect, the Kerr effect, and others. In FIG. 4 tuner 440 is positioned such that phase tuning primarily impacts layer 401*a*. In some embodiments (not shown) the tuner can be positioned such that phase tuning primarily impacts layer 402. Tuning of layer 402 can utilize thermal effects, but, in some cases where materials exhibit electro-optic effects such as LiNbO3, tuning can use other tuning mechanisms than the thermal one.

Device 400 also comprises electrical contacts (not shown) used to provide current/voltage to the active device and also to the heater element 440 (if present).

Figure 5:
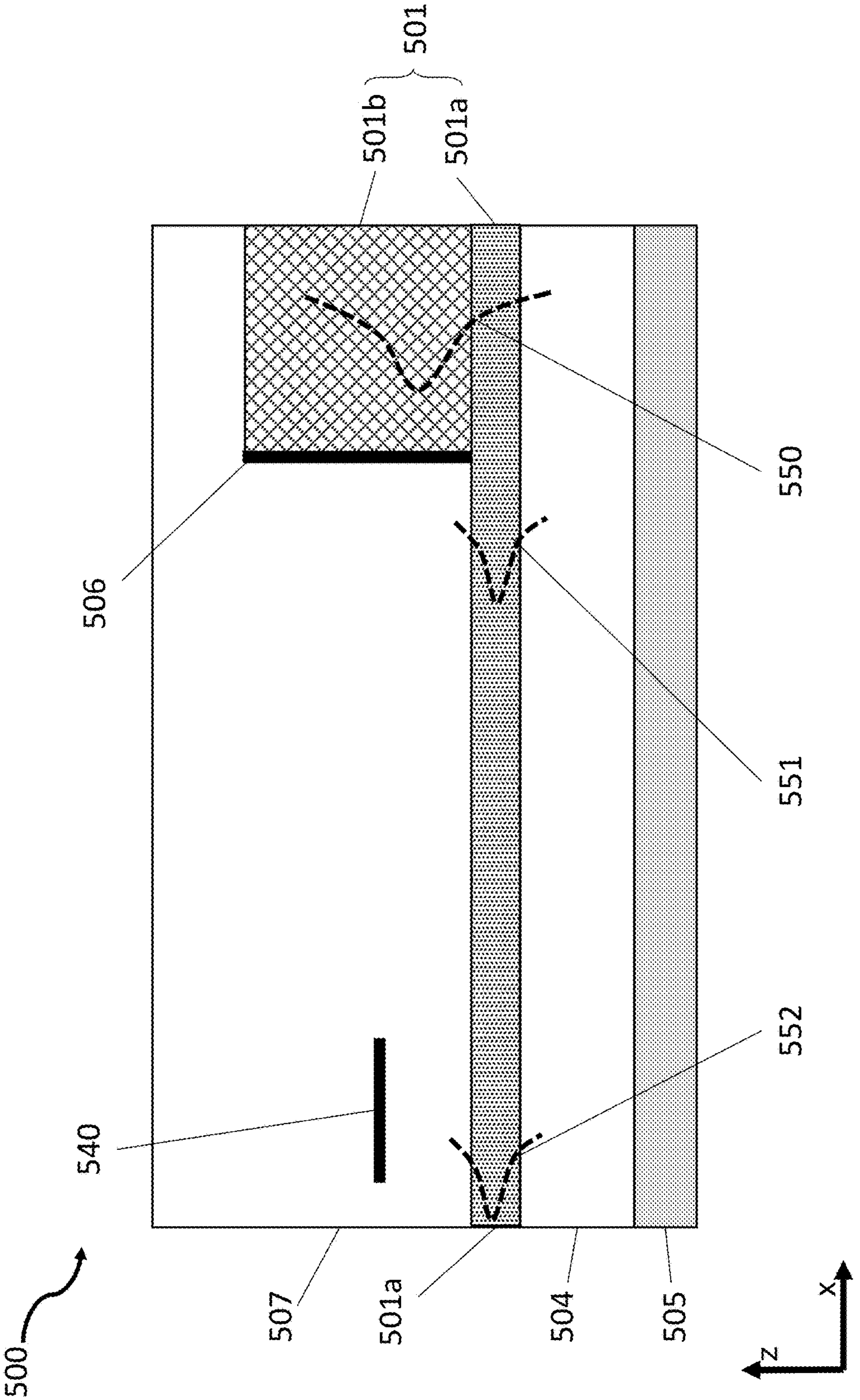
FIG. 5 illustrates a device according to one embodiment of the present invention, shown in cross section.

FIG. 5 is a schematic cross-section view of an embodiment of an integrated photonic device 500 similar to device 400 in supporting a highly divergent facet (in this case at the facet of layer 401*a* shown at the edge on the left side of the figure) corresponding to 205/305/306 in FIGS. 2-3 while supporting integration of an on-chip source (corresponding to 210/310/401 in FIGS. 2-4). Functional layers 501 to 540 (unless explicitly defined differently) correspond to functional layers 401 to 440 as described in relation to FIG. 4. The key difference between the embodiments of FIG. 5 and FIG. 4 is the absence of waveguide layer 402 and intermediate waveguide layers 403*a*/403*b* in device 500.

Layer 501 is bonded on top of layer 504. The bonding can be direct molecular bonding, or additional materials can be used to facilitate bonding such as e.g. polymer films as is known in the art. The bonding material, if used, has to have reasonably low losses at the wavelength of operation as the optical modes 550, 551, and 552 (described in more detail below) have some overlap with layer 504. Layer 501 comprises two distinct sublayers 501*a* and 501*b*. Sublayer 501*a* comprises a compound III-V semiconductor waveguide structure suitable for providing one or more high divergence facets as described above in the discussion of FIGS. 1-3. Sublayer 501*b* makes up what is commonly called an active device, and is made up of materials including, but not limited to InP and InP-based ternary and quaternary materials, GaAs and GaAs based ternary and quaternary materials, GaN and GaN based ternary and quaternary materials, GaP, InAs and InSb and their variations and derivatives or any other suitable material for providing optical emission at wavelengths of interest. Sublayer 501*b* comprises additional sublayers to provide optical gain (by forming, for example, quantum wells, quantum dots or similar structures), and optical and electrical confinement as needed for efficient electrically injected optical sources. Sublayers of layer 501*b* in some embodiments provide vertical confinement (along the z-axis in FIG. 5), while lateral confinement (along an unshown y-axis, normal to the cross-section in FIG. 5) is provided by at least one etch, as is known in the art for active devices. The interface between sublayers 501*a* and 501*b*, in some embodiments, comprises an etch selective structure (not shown) that enables superior control of the sublayer 501*b* removal from the top of sublayer 501*a* over the portion shown on the left side of the FIG. 5. In these cases, sublayer 501*a* provides a highly divergent facet at its end surface while preserving its own high-quality top surface.

Tapers (not shown) in sublayer 501*b* are utilized in some embodiments to facilitate efficient coupling between mode 550 and mode 551. This tapering can be efficient, even if taper tips are not extremely narrow, as the refractive indexes of sublayers 501*a* and 501*b* are similar (both comprising compound III-V semiconductor materials). In other embodiments, an etched facet is present as shown, at the transition between modes 550 and 551. Optional layer 506 can serve as either an anti-reflective or a highly reflective coating at the etched facet.

Modes 551 and 552 can be identical (if the output facet dimensions at the left end surface of 501*a* are the same as the dimensions of the waveguide), or they can be different if waveguides are optimized for different requirements than simply the high divergence for which the facet is optimized. The transition between modes 551 and 552 can involve the use of tapers.

Optional heater element 540 (corresponding to heater 340) can be realized as a resistive element to provide thermal tuning of the phase of the optical mode 552. In other embodiments (not shown), the phase tuning can utilize the electro-optic tuning capability of the compound semiconductor material making up sublayer 501*a*. That capability may make use of effects including electro absorption, the Franz-Keldysh effect, the quantum-confined Stark effect, the Pockels effect, the Kerr effect and others.

Device 500 also comprises electrical contacts (not shown) used to provide current/voltage to the active device and also to the heater element 540 (if present).

Figure 6:
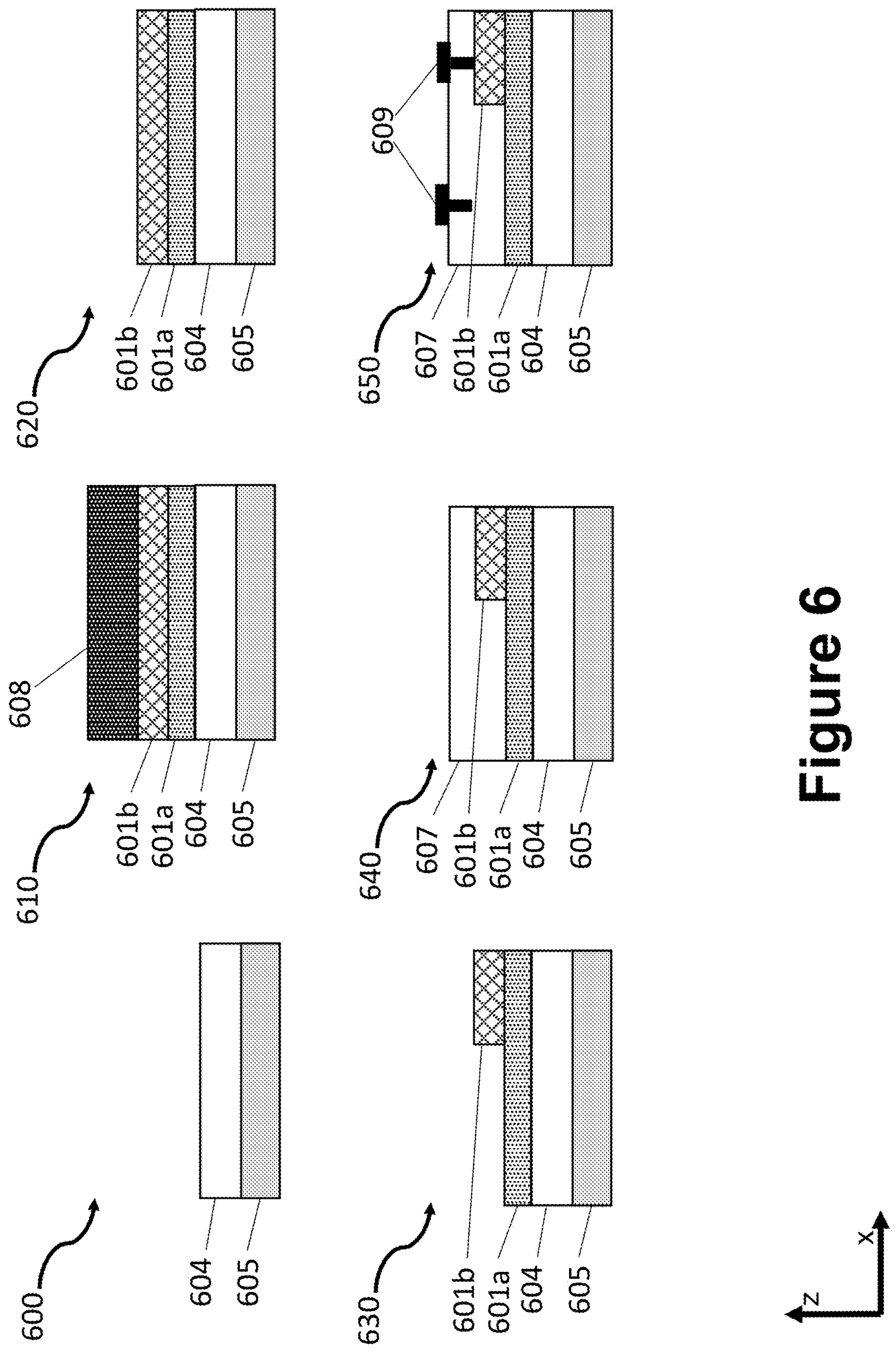
FIG. 6 illustrates a process flow to fabricate to some embodiments of the present invention.

FIG. 6 shows six cross-section views (600, 610, 620, 630, 640 and 650) corresponding to some illustrative steps in the operations carried out to make integrated devices of the types described above in relation to FIG. 5.

In this illustrative case, operations specific to a heterogeneous platform for the fabrication of devices with facets from which highly divergent beams may be emitted begin with view 600, in which a suitable substrate 605 and cladding 604 are prepared for subsequent bonding to a sublayer structure shown in view 610. Bonding includes either bonding dies to a wafer, or wafer to wafer bonding, where the bonded die/wafer structure comprises sublayers 601*a*/601*b* (corresponding to sublayers 501*a*/501*b*) that are grown on another suitable substrate 608.

In view 620, substrate 608 is removed, typically by a combination of chemical/mechanical polishing/lapping and etching to leave only sublayers 601*a*/601*b* on top of the cladding and substrate. The process then proceeds to view 630 with patterning both sublayers 601*a*/601*b* to define the facet, optical source and waveguides before proceeding to view 640 in which top-side cladding 607 is deposited. Finally, in view 650, metallization 609 is performed to provide contacts for electrically pumping the optical source, and contacts for controlling the tuner element (if present).

The operations for making the devices need not always include all the functions, operations, or actions shown, or to include them in exactly the sequence illustrated in FIG. 6, from views 600 to 650. Additional processing of the various dielectric and/or semiconductor layers, and/or electrical contacts, vias and the addition and processing of index matching layers may be performed as is known in the art. This can include heaters, passivation, etching trenches, forming light blocking structures and/or similar.

Similar operations can be utilized to realize integrated devices of the types described above in relation to FIG. 4, by adding steps to deposit and pattern layers 402, 403*a*, 403*b*, and prepare layer 402 suitably for the bonding step including the deposition and planarization of layer 408.

The illuminator PIC of any of the embodiments discussed above may be combined with a lens and/or diffuser system to further shape the output. The integrated illuminator is typically combined with a camera system used to image the projected illumination or pattern, and electronic circuitry that controls both the illuminator and the camera. In some embodiments, the integrated illuminator can be operated in a pulsed regime; in some other cases it can be operated in a continuous wave regime. In yet other embodiments, the optical source can be modulated in one or more of amplitude, frequency and phase, for additional functionality. A typical use of an integrated illuminator paired with a camera system is in depth perception and space mapping, which can be beneficial in multiple applications. To improve the performance of the combined illuminator/camera system, the camera can include a band-pass filter to keep out other signals (due for example to sunlight) from saturating the individual detection elements and improve the combined system's overall signal to noise ratio.

It is to be understood that these illustrative embodiments teach just some examples of heterogeneously integrated illuminators according to the present invention, and that many similar arrangements can be further envisioned. Furthermore, such illuminators can be combined with multiple other components to provide additional functionality or better performance such as various filtering elements, amplifiers, monitor photodiodes, modulators and/or other photonic components.

Embodiments of the present invention offer many benefits. The integration platform enables scalable manufacturing of PICs made from multiple materials providing higher-performance and/or the ability to operate in particular wavelength ranges of interest.

This present invention utilizes a process flow consisting typically of die/wafer-bonding of a piece or wafer of compound semiconductor material to dielectric waveguides defined on a substrate wafer (as is described with the help of FIG. 6) and subsequent semiconductor fabrication processes known in the art. It enables an accurate definition of optical alignment between active and passive waveguides using common alignment marks and advanced lithography, removing the need for precise physical alignment. Said lithography-based alignment allows for scalable manufacturing using wafer scale techniques.

It is to be understood that optical coupling between modes in active and passive layers is reciprocal, so that, taking FIG. 4 as illustrative, the structure can be configured to facilitate light transmission from region 401 to region 402 and finally region 401*a*, but also to facilitate transmission in the reverse direction, from region 401*a* to region 402 and finally to region 401. It is to be understood that multiple such transitions with no limitation in their number or orientation can be realized on a suitably configured PIC.

Embodiments of the optical devices described herein may be incorporated into various other devices and systems including, but not limited to, various computing and/or consumer electronic devices/appliances, industrial systems, communication systems, medical devices, sensors and sensing systems and other areas that can benefit from small size illuminators.

It is to be understood that the disclosure teaches just a few examples of the illustrative embodiment and that many variations of the invention can easily be devised by those skilled in the art after reading this disclosure and that the scope of the present invention is to be determined by the following claims.

The invention claimed is:

1. A device comprising:

first, second, third, fourth and fifth elements fabricated on a common substrate, the first element comprising an optical source, the second element comprising first and second optical facets coupled to free space, the third element comprising a waveguide that optically couples the first element to the second element, and the fifth element comprising a tuner element;

wherein each of the first and second optical facets, comprising a compound III-V semiconductor material as a core and a dielectric material as a cladding, is characterized by a refractive index contrast between the core and the cladding that is greater or equal to 1;

wherein an optical beam exiting each of the first and second facets is characterized by a central beam propagation axis and a FWHM beam divergence greater than 40 degrees referred to at least one axes perpendicular to the corresponding central beam propagation axis;

wherein the fourth element comprises a second splitter structure that is optically coupled to the optical source of the first element and to the first and second facets of the second element, the second splitter structure being configured to provide a first output to the first facet and a second output to the second facet, with substantially similar output power delivered to each of the first and second facets;

wherein the first and second facets are separated by a distance d between 0.5 μm and 1000 μm, the distance d determining an angular spacing of a fringe pattern characterizing an optical beam generated by the device as a device output;

wherein the tuner element is configured to adjust optical phase of light exiting the device at at least one of the first and second facets; and wherein the optical phase adjustment results in steering a far-field fringe pattern of the generated optical beam.

2. The device of claim 1, wherein each of the cores of the first and second facets and a core of the waveguide of the third element comprises one of GaAs, AlGaAs, and InGaP; and wherein the claddings of the first and second facets comprise one of $SiO_2$ and SiNOx.

3. The device of claim 2, wherein the optical source of the first element is one of a Fabry-Perot laser, a single-frequency laser, a wavelength-stabilized laser, a tunable laser and a super luminescent diode.

4. The device of claim 3, wherein the optical source is configured to output light in a wavelength range characterized by a center wavelength between 850 nm and 1000 nm, and wherein each of a thickness and a width of the cores of the first and second facets is less than 300 nm.

5. The device of claim 1, wherein the waveguide of the third element has a core comprising one of SiN and SiNOx; and wherein the cores of the first and second facets comprise one of GaAs, AlGaAs, and InGaP; and wherein the claddings of the first and second facets comprise one of $SiO_2$ and SiNOx.

6. The device of claim 5, wherein the optical source of the first element is one of a Fabry-Perot laser, a single-frequency laser, a wavelength-stabilized laser, a tunable laser and a super luminescent diode.

7. The device of claim 6, wherein the optical source is configured to output light in a wavelength range characterized by a center wavelength between 850 nm and 1000 nm, and wherein each of a thickness and a width of the cores of the first and second facets is less than 300 nm.

* * * * *